Nov. 23, 1926.                                              1,607,659
J. E. WILL
BEEHIVE
Filed July 12, 1926
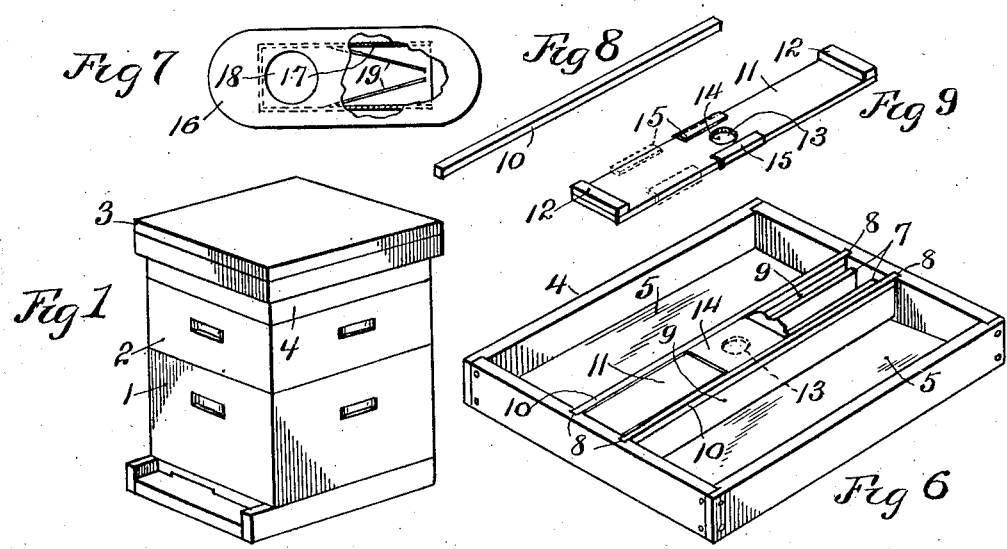
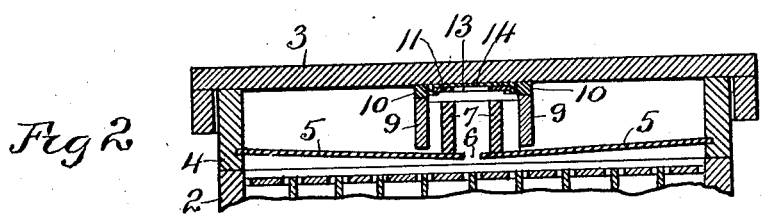
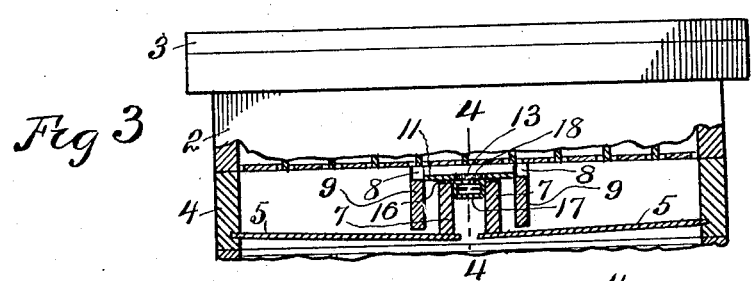
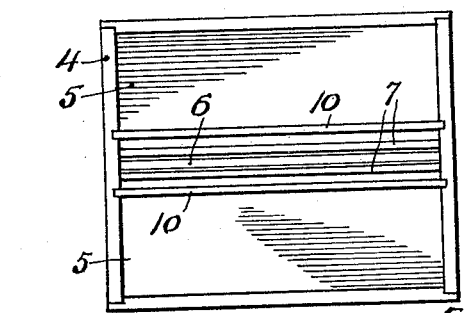
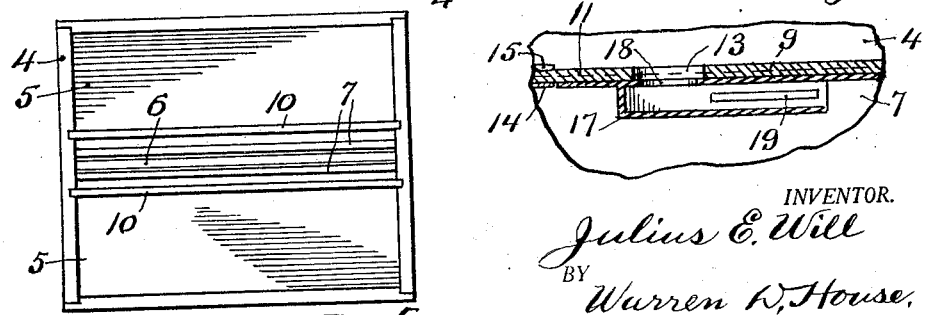
INVENTOR.
Julius E. Will
BY Warren W. House,
His ATTORNEY.
Witness:
R. E. Hamilton Patented Nov. 23, 1926.

1,607,659

UNITED STATES PATENT OFFICE.

JULIUS E. WILL, OF INDEPENDENCE, MISSOURI.

BEEHIVE.

Application filed July 12, 1926. Serial No. 121,744.

My invention relates to improvements in bee hives. It relates particularly to sectional hives having comb sections detachable from the brood sections.

One of the objects of my invention is to provide an improved hive section adapted for insertion between the other hive sections and the hive cover and having novel means for feeding the bees or as a protection from cold weather, and also adapted for insertion between the brood section and a comb section, and provided with novel means for effecting the escape of the bees from the comb section to the brood section.

My invention provides further a novel hive section adapted for the uses specified and which is simple, cheap, strong, durable, not liable to get out of order, which is adapted for sectional hives now in use, and which may be easily manipulated by unskilled persons.

The novel features of my invention are hereinafter fully described and claimed.

In the accompanying drawings, which illustrate the preferred embodiment of my invention, Fig. 1 is a perspective view of a sectional hive provided with my improvement.

Fig. 2 is an enlarged vertical sectional view of an upper portion of the same, showing my improved section arranged to serve as a feeder or as an auxiliary protecting cover, the feeding material being omitted.

Fig. 3 is a side view, partly broken away and partly in elevation and partly in vertical section, showing my improved hive section disposed between the brood and comb chambers, and arranged as a bee escape.

Fig. 4 is an enlarged section on the line 4—4 of Fig. 3.

Fig. 5 is a top view of my improved hive section, the cover member being omitted.

Fig. 6 is a perspective view, partly broken away, of my improved hive section, shown arranged as a food container.

Fig. 7 is a top view, partly broken away, and reduced, as compared with Fig. 4, of a one way bee gate of usual type adapted for use in connection with my improved hive section.

Fig. 8 is a perspective view of one of the two filler members.

Fig. 9 is a perspective view of the cover member, depressed portion up, and the bee passage closure mounted thereon.

Similar characters of reference designate similar parts in the different views.

1 designates the bottom or brood section of a sectional hive of usual type, 2 a comb section of usual type, mounted on the section 1, as shown in Fig. 1, 3 the hive cover shown in Fig. 3 as mounted on the comb section 2, and shown in Figs. 1 and 2 as mounted on the top of the body 4 of my improved hive section, said body being shown as rectangular, and of the peripheral dimensions of the sections 1 and 2.

The body 4 has an open top and a bottom 5 which, preferably, slopes toward the middle from opposite sides of the section. At the middle, the bottom 5 is provided with a longitudinal opening 6, which serves as a bee passage.

Mounted on the bottom 5 at opposite sides respectively of the passage 6 and extending from end to end of the section 4 are two longitudinal vertical partitions 7, which are spaced at their upper edges from the top plane or upper edges of the body 4.

Opposite ends of the body 4 are each provided on its inner side with two vertical grooves 8, which extend downwardly from the upper edge of said end, and which are disposed respectively at the outer sides of and spaced from the partitions 7, Figs. 2 and 3.

Respectively mounted in the grooves 8 are two longitudinal outer partitions 9, which are spaced from the bottom 5 to permit of the passage under them of bee food, preferably liquid, which may be placed in the body 4 at the outer sides of the partitions 9. The spaces under the partitions 9 are too shallow to permit of the passage under the partitions 9 of bees. The upper edges of the partitions 9 are spaced from the top plane of the body 4.

When the section 4 is to be used as a feeder or as an auxiliary cover, removable filler members 10 are fitted in the grooves 8 respectively above the partitions 9 and resting thereon and extending to the top plane of the body, as shown in Fig. 2.

Reversible top for bottom and adapted to be removably mounted on the inner partitions 7, and with its longitudinal edges adapted to engage the outer partitions 9, is a cover member 11, Fig. 9, provided on one side respectively adjacent to its ends with two cleats 12, which form on said side a depressed portion between the cleats having a central hole 13, which, when the cover member is in operative position, is disposed between the inner partitions 7, and serves with the depressed portion of the cover member as a bee passage.

Slidably fitted on the cover member 11 between the cleats 12 is a closure 14, preferably a metal plate having end flanges 15 inwardly turned over opposite longitudinal edges of the member 11, Fig. 9.

The closure 14 is adapted to be slid to and from a position in which it will close the hole 13.

When my invention is to be used as a feeder for the bees, the body 4 is disposed, as shown in Figs. 1 and 2, on the comb section 2, with the filler members 10 mounted in the grooves 8 on the outer partitions 9. The cover member 11 is mounted on the inner partitions 7 with the cleats 12 and depressed portion thereof facing downwardly. The closure 14 is moved to the closed position covering the opening 13, as shown in solid lines in Fig. 9.

Liquid food material is placed in the body 4 on the bottom 5 at the outer sides of the partitions 9. The food material will pass upwardly between the partitions 9 and 7, and will be accessible to bees passing upwardly from the comb section 2, through the bee passage 6, and between and onto the inner partitions 7, and under the cover member 11. The closure 14 being closed, the hive cover 3 may be removed for the purpose of inserting food into the section, without danger of the bees getting out through the opening 13.

In the winter time, the body 4 may be filled with saw dust or other poor heat conducting material, so that the section will serve as an auxiliary cover to protect the bees from the cold.

When it is desired to use the section 4 as a bee escape to rid the comb section 2 of bees, the section 4 is inserted, as shown in Fig. 3, between the comb section 2 and the brood section 1. The filler members 10 are removed, and the cover member is disposed with the cleats 12 and depressed portion up, on the partitions 7 and between the partitions 9.

A one way bee gate of any usual type is then placed under the cover member 11 on the partitions 7 with the opening 13 alining with the entrance of the bee gate, the closure 14 being moved to uncover the opening 13, as shown in dotted lines in Fig. 9 and in solid lines in Fig. 4.

In the type of bee gate shown, the gate comprises a metal plate 16, Fig. 7, the under side of which has fastened to it a channel portion 17 closed at one end and open at the other, Fig. 4. The plate 16 has a hole 18 communicating with said channel 17, and which, in use is alined with the opening 13 of the cover member 11, the plate 16 being mounted on the partitions 7 with the channel portion 17 between said partitions, Fig. 3. Opposite inner sides of the channel portion 17 have respectively fastened to them slender pliable springs 19, the free ends of which are spaced slightly apart to permit a bee to pass in one direction, but preventing it from passing in the other direction toward the hole 18.

The bees in the comb section 2, which is now disposed above the section 4, will pass into the latter section and will crawl over the partitions 9 onto the cover member 11, Fig. 3, and through the opening 13 and hole 18 into the channel portion 17, from which they will pass out the open end thereof, past the springs 19, between the partitions 7, and through the passage 6 into the brood section 1 below.

I do not limit my invention to the structure shown and described, as many modifications, within the scope of the appended claims, may be made without departing from the spirit of my invention.

What I claim is:—

1. In a bee hive, a hive section having an open top and a bottom having a bee passage, two longitudinal partitions on said bottom at opposite sides respectively of said passage and spaced from the top plane of said section, and a cover member reversible top for bottom on said partitions and having in one side a depressed portion having an opening between said partitions and adapted to form a bee passage.

2. In a bee hive, a hive section having an open top and a bottom having a bee passage, two longitudinal partitions on said bottom at opposite sides respectively of said passage and spaced from the top plane of said section, a cover member reversible top for bottom on said partitions and having in one side a depressed portion having an opening between said partitions and adapted to form a bee passage, and a closure for said opening.

3. In a bee hive, a hive section having an open top and a bottom having a bee passage, two longitudinal partitions on said bottom at opposite sides respectively of said passage and spaced from the top plane of said section, a cover member reversible top for bottom on said partitions and having in one side a depressed portion having an opening between said partitions and adapted to form a bee passage, and a closure slidable on said cover member to and from a position closing said opening.

4. In a bee hive, a hive section having an open top and a bottom having a bee passage, two longitudinal partitions on said bottom at opposite sides respectively of said passage and spaced from the top plane of said section, a cover member on said partitions having in one side a depressed portion having an opening between said partitions and adapted to form a bee passage, and a bee gate between said partitions having a one way passage communicating with said opening and said bottom passage.

5. In a bee hive, a hive section having an open top and a bottom having a bee passage, two longitudinal inner partitions on said bottom at opposite sides respectively of said passage and spaced from the top plane of said section, two longitudinal outer partitions at the outer sides of and respectively spaced from said inner partitions and spaced from said top plane, and a cover member on said inner partitions and fitted between and adapted to engage said outer partitions and having a depressed portion in one side having a bee passage opening between said inner partitions.

6. In a bee hive, a hive section having an open top and a bottom having a bee passage, two longitudinal inner partitions on said bottom at opposite sides respectively of said passage and spaced from the top plane of said section, two longitudinal outer partitions at the outer sides of and respectively spaced from said inner partitions and spaced from said bottom and said top plane, two longitudinal filler members respectively removably mounted on said outer partitions and extending to said top plane, and a cover member reversible top for bottom on said inner partitions and engaging said filler members and having in one side a depression having an opening between said inner partitions and adapted to form a bee passage.

7. In a bee hive, a hive section having an open top and a bottom having a bee passage, two longitudinal inner partitions on said bottom at opposite sides respectively of said passage and spaced from the top plane of said section, two longitudinal outer partitions at the outer sides of and respectively spaced from said inner partitions and spaced from the said top plane and bottom, two longitudinal filler members respectively removably mounted on said outer partitions and extending to said top plane, a cover member reversible top for bottom on said inner partitions and between said filler members and having in one side a depressed portion having an opening between said inner partitions and adapted to form a bee passage, and a closure for said opening.

8. In a bee hive, a hive section having an open top and a bottom having a bee passage extending between opposite ends of said section, two longitudinal inner partitions on said bottom at opposite sides respectively of said passage and spaced from the top plane of said section, each of the inner sides of said ends having extending from the upper edge of said section two vertical grooves respectively at the outer sides of and spaced from said partitions, two longitudinal outer partitions respectively fitted at their ends in said grooves and spaced from said bottom and from said top plane, two longitudinal filler members respectively removably fitted in said grooves on said outer partitions and extending to said top plane, and a cover member reversible top for bottom on said inner partitions between said filler members and having in one side a depressed portion having an opening between said inner partitions and adapted to form a bee passage.

9. In a bee hive, a hive section having an open top and a bottom having a bee passage between opposite walls, each of said walls in its inner side having, extending from the top of the wall, two vertical grooves at opposite sides respectively of said passage, two longitudinal inner partitions on said bottom at opposite sides respectively of said passage and between and spaced from said grooves and spaced from the top plane of said section, two longitudinal outer partitions respectively fitted in said grooves and spaced from said bottom and said top plane, two longitudinal filler members respectively removably fitted in said grooves on said outer partitions and extending to said top plane, a cover member reversible top for bottom on said inner partitions between said filler members and having in one side a depressed portion having an opening between said inner partitions and adapted to form a bee passage, and a closure slidable on said cover member to and from a position closing said opening.

In testimony whereof I have signed my name to this specification.

JULIUS E. WILL.